United States Patent
Smith et al.

(10) Patent No.: US 7,079,114 B1
(45) Date of Patent: *Jul. 18, 2006

(54) INTERACTIVE METHODS FOR DESIGN OF AUTOMOBILES

(76) Inventors: Peter Smith, 1935 Orchard View Dr., Ann Arbor, MI (US) 48108; Timothy R. Pryor, 416 Old Tecumseh Rd., Tecumseh (CA) N8N 3S8

( * ) Notice: Subject to any disclaimer, the term of this patent is extended or adjusted under 35 U.S.C. 154(b) by 461 days.

This patent is subject to a terminal disclaimer.

(21) Appl. No.: 10/424,975

(22) Filed: Apr. 29, 2003

Related U.S. Application Data

(63) Continuation-in-part of application No. 09/138,285, filed on Aug. 21, 1998, now Pat. No. 6,720,949.

(60) Provisional application No. 60/376,353, filed on Apr. 29, 2002.

(51) Int. Cl.
*G09G 5/08* (2006.01)

(52) U.S. Cl. .................. 345/158; 345/156; 345/419

(58) Field of Classification Search .............. 345/425, 345/156, 157, 158; 463/30–32, 37
See application file for complete search history.

(56) References Cited

U.S. PATENT DOCUMENTS

| | | | | |
|---|---|---|---|---|
| 5,966,310 | A * | 10/1999 | Maeda et al. | 707/104.1 |
| 5,982,352 | A * | 11/1999 | Pryor | 345/156 |
| 6,049,327 | A * | 4/2000 | Walker et al. | 345/158 |
| 6,097,369 | A * | 8/2000 | Wambach | 345/158 |
| 6,198,487 | B1 * | 3/2001 | Fortenbery et al. | 345/420 |

* cited by examiner

*Primary Examiner*—Kent Chang
(74) *Attorney, Agent, or Firm*—Douglas E. Jackson; Stites & Harbison PLLC

(57) ABSTRACT

The invention concerns new computer aided methods and apparatus for designing objects, particularly 3D objects, and especially those having a sculpted form such as found in automobiles, boats, planes, furniture and certain fashion apparel items. Preferred embodiments employ optical sensing of the designers' hands, fingers, or styling implements, or his sketches, in conjunction with large screen displays and several novel software based methods which have the further advantage of direct interface to conventional CAD (Computer Aided design) systems which are then used to physically manifest the results as models, tooling or whatever. Use of the invention not only saves time and cost, but allows, in a "natural" way, much greater freedom of expression for the artist/designer than any known computer based system.

20 Claims, 13 Drawing Sheets

FIG. 8

CURVE SMOOTHING WEIGHTS (UNIFORM) 3 X 1
.333333  .333333  .333333

CURVE SMOOTHING WEIGHTS (TRIANGULAR) 3 X 1
.250000  .500000  .250000

CURVE SMOOTHING WEIGHTS (UNIFORM) 5 X 1
.200000  .200000  .200000  .200000  .200000

ETC.

SURFACE SMOOTHING WEIGHTS (UNIFORM) 3 X 3
.111111  .111111  .111111
.111111  .111111  .111111
.111111  .111111  .111111

SURFACE SMOOTHING WEIGHTS (USER FAVORITE) 5 X 5
.000000  .020000  .040000  .020000  .000000
.020000  .040000  .080000  .040000  .020000
.040000  .080000  .200000  .080000  .040000
.020000  .040000  .080000  .040000  .020000
.000000  .020000  .040000  .020000  .000000

ETC.

INTERACTIVE METHODS FOR DESIGN OF AUTOMOBILES

RELATED APPLICATIONS

This application claims benefit of U.S. Provisional Patent Application 60/376,353 entitled "Interactive Methods for Design of Automobiles" filed Apr. 29, 2002

This application is a continuation in part of U.S. Ser. No. 09/138,285 filed Aug. 21, 1998, now U.S. Pat. No. 6,720,949 NOVEL MAN MACHINE INTERFACES AND APPLICATIONS the disclosure of which is incorporated by reference in its entirety

CROSS REFERENCES TO RELATED APPLICATIONS

The disclosure of NOVEL MAN MACHINE INTERFACES AND APPLICATIONS, U.S. Ser. No. 09/138,285, is hereby incorporated by reference in its entirety

FEDERALLY SPONSORED R AND D STATEMENT

Not applicable

MICROFICHE APPENDIX

Not applicable

FIELD OF THE INVENTION

The invention concerns new computer aided methods and apparatus for designing objects, particularly 3D objects, and especially those having a sculpted form such as found in automobiles, boats, planes, furniture and certain fashion apparel items such as shoes. Preferred embodiments employ optical sensing of the designers hands, fingers, or implements, in conjunction with large screen displays and several novel software based methods which have the further advantage of direct interface to conventional CAD (Computer Aided design) systems which are then used to physically manifest the results as models, tooling or whatever. Use of the invention not only saves time and cost, but allows, in a "natural" way, much greater freedom of expression for the artist/designer than any known computer based system. Processes for more economic and customer responsive design of Automobiles are particularly disclosed.

BACKGROUND OF THE INVENTION

Today, the initial design of vehicles for the motoring public is undertaken in "Styling Studios". There, conceptual 3D perspective renderings of a vehicle are made and then, after suitable approvals, brought to life by one of two methods. The first is the time honored and still prevalent construction of models, first in small scale, and then after more approvals full size. These are the famous "Clay Bodies" of automotive lore.

The second method which has enjoyed a lot of attention but has not proven satisfactory for the basic creation process is the use of computer based styling programs such as "ALIAS" to render images. The problems with this are several, among them a need for a high degree of training, and the artificial nature of expression it imposes on the designer, who is required to painstakingly "pull points" at given surface locations to effect change, an effort which is very constraining compared to the act of physical sculpture which can affect local areas in various desired ways simultaneously. In addition the prior art is often restricted to use with constant tangencies or continuous curvature. The designer can not interactively and amorphously created flowing 3D shapes the process is artificial and imposes such restraints that often "work arounds" are employed which in turn result in ugly vehicles if rushed through to completion without going through the clay body physical manifestation process. The famous "Aztek" of General Motors is thought to be an example.

The net result is that most stylists, at the conceptual stage of design to which this invention is addressed, don't use ALIAS or similar programs, and thus have not been able to effectively participate in the computer based techno-revolution engulfing the rest of society. While we are less familiar with the apparel fashion trade, it is likely that a some what similar situation holds true for designers thereof as well By contrast, the invention allows the designer to interactively apply mathematical rules concerning slopes and shapes relating to geometric regions of various sizes around points along curves of his desired over all expression. In addition the rules may be applied automatically by program iteration under the direction of the designer or executive who wishes to see the effect of various approaches There is no prior art we are aware of which pertains to methods and apparatus similar to the invention to aid the artistic expression needs of the stylist, artist, or sculptor. Certain aspects of the invention can be found however, in the fields of Perceptual User Interfaces (especially Gesture Recognition), Virtual reality, and Computer Aided Design. The closest known example in the patent or other art is U.S. Pat. No. 5,237,647 by Roberts et al. This patent discloses method of 3D design in a virtual reality type of system, in which the user may hold a sensor device in each hand and whose sensor position is tracked by a computer. But Roberts et al. does not teach several key issues including for example, the use of a physical object to reference ones hand or finger to in order to control the creation or change in a data base of the same or different object represented on a display. Nor does Roberts disclose the use of software having a sculpting capability free of the difficulties engendered in "pulling points" using polynomial based approaches In addition, Roberts et al. utilizes sensors which require bulky cables to be used considerably limiting the designer, and which do not allow the designer to easily use natural finger or hand input, which is made possible with the non contact optical sensing of the instant invention. The sensing approach of Roberts et al further does not allow a user to describe in an easy hand motion a shape desired, as can the invention, a critical item in some automobile applications where the reference object is a full scale car or model thereof (e.g. "Clay body").

Furthermore, neither Roberts et al. or any other known reference discloses a mechanism for use with such models, or full size object representations as does the invention, which also discloses a process which may be easily used by designers to create or modify the 3D representation in the computer or in the physical model. In addition Roberts et al. does not teach methods by which to modify existing object data bases, such as a CAD model of a competitors vehicle, and does not disclose mapping, filtering or many other aspects of the present invention which enable it to be extremely useful in design of automobiles.

In summation, the numerous input restrictions of the Roberts et al invention, its lack of teaching concerning utilization of existent data bases, and its reliance of on generating a totally virtual 3D graphic representation on the computer screen, restrict its use by today's practitioners of automotive design, who are accustomed to drawing 3D perspective sketches and creating or modifying physical 3D models of proposed designs. It is to this group, that the invention herein is addressed. In so doing large economic benefits result related to time to market and customer acceptance of the designs produced.

SUMMARY OF THE INVENTION

One of our previous co-pending applications, entitled "Novel Man Machine Interfaces", described electro-optical method and apparatus for human interaction with computers, primarily employing TV Cameras, and in some cases encompassing human interaction with full size screen displays. Among the many illustrative applications disclosed, were applications to the design of contoured objects such as cars and fashion garments. Application to both objects and models thereof at workstations, and larger size objects either real or virtually displayed were illustrated.

This application seeks to improve on these design related aspects particularly in the sense of providing tools for the artist or sculptor to facilitate his or her expression and more rapidly enable their visions to be turned into reality. This application also seeks to layout the software framework of such tools and provide for their use with conventional design systems. In addition, herein disclosed are revolutionary methods for implementing design of vehicles or other objects which allow one to "Cross Breed" or blend aesthetic features of different vehicles or other objects or portions thereof.

The sum total of the invention is to facilitate wholly new processes for vehicle design, which can allow better designs to be made available to the public in a shorter time frame—an issue of vital interest to vehicle manufacturers today.

The invention herein concerns two primary issues. First is the creation of natural modes of interface to the computer, and 3D graphics software which can respond to such inputs in a manner much like the physical act of sculpting clay. Inputs are sensed typically with stereo camera or other optically based apparatus are typically used to sense 3D location or orientation of "props" and other objects employed by the user of the invention, in addition to his own hands, fingers and voice.

The Second major aspect is the creation via the same software based process of a sort of "Geometric Spreadsheet" allowing machine based as well as human directed iteration of sculpted designs, which after any iteration can be displayed in 3D graphics form using known methods (including 3D glasses if desired), or the data file used to drive 3D model making machines capable of turning the design into a hand held, ⅓ scale, or even full scale model.

This process is more natural, and much easier for persons not trained in the black arts of specialized programs such as ALIAS Rendering programs or conventional CAD programs, to understand. (these heretofore disenfranchised persons are in fact those of most importance to the design—the stylist, the car executive, and even the end customer). In one preferred embodiment, The software of the invention acts as a transaction layer over laying such a conventional CAD program A typical creation is a sculpted surface of a car body, which can be physically reproduced using the program in which the surface shape has been created. This physical object, such as a car model, even life size, may then be further elaborated using the method of the invention. In a novel manner and at little cost compared to existing techniques, the design and evaluation process may be iteratively continued by a single designer or even a networked group of interested persons, until the desired final shape is produced. Then, using well known processes, the data in the CAD system can then be directly used to produce tools such as dies or molds used to form steel surfaces of the real object.

A dramatic aspect of the invention is its ability to facilitate interaction with a display, and typically a full size display, in a way that is un-encumbered, natural, and consistent with artistic gestures used for centuries. And the interaction is directly manifested in software which can be not only used to display the result of ones artistic expression, but to manufacture the item or its model as well.

The invention, in the spirit of the above, further includes method and apparatus for modifying the artistic flow of an object's shape as a function of musical notes and chords—either as a function of the character of the music itself (e.g. rock vs. classical), or as a function of the effect of the music on the designer.

In addition to the above, the invention also concerns methods by which the development of new designs may take place and the software based algorithms which allow the rapid conversion of ideas into surface shapes which can be displayed or otherwise acted upon.

By enabling the use of the computer at the early stage of design, an extremely important "What if" capability is provided, which can drastically shorten the time needed to arrive at a successful concept. One can using the invention, for example, blend the design of classical car bodies (e.g. a '57 Chevy) with other more recent models, for example to get a "retro" look. Or using the invention, one can blend competitor's creations with yours—a famous subjective remark in the car press (e.g., "from the back it sort of looks like a Mercedes 300", or some such). Such attempts can literally be automated using the invention until a desired look is achieved.

DESCRIPTION OF FIGURES

The invention is described in the following embodiments:

FIG. 8 illustrates a library of functions

DETAILED DESCRIPTION OF THE EMBODIMENTS OF THE INVENTION

FIG. 1

Figure 1A:
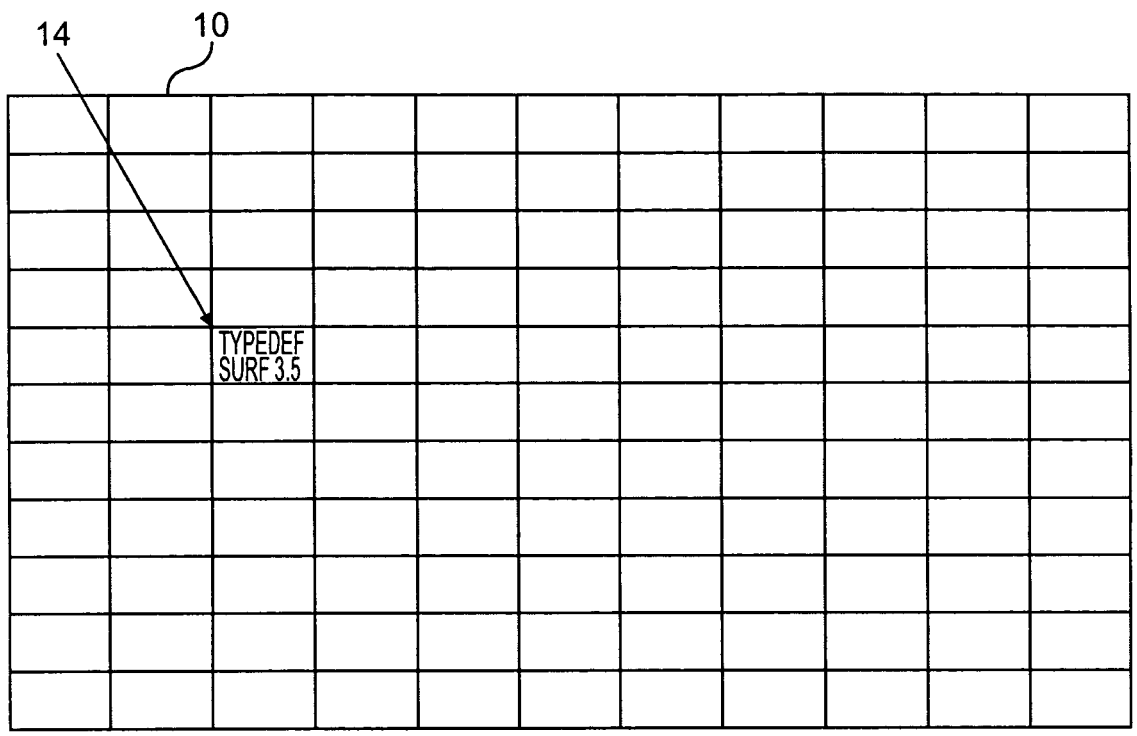
FIG. 1 describes a meshing software method providing a sculpting capability useful in the applications herein.

CAD systems today operate with fixed parameters which are not variable as a function of the location on a surface to be described in a generated computer model. These parameters are typed in or preset to define everything from the offset of a curve or surface to the shape or diameter of a hole. In addition, all conventional prior art CAD systems have facilities to modify a curve or surface by "pulling a point". This means that the user can reposition a single point that partially controls the local shape. The problem is that this method has the effect of dropping a drop of water into a glass of water: it creates local ripples.

CAD as currently used is an exact 3D implementation of fixed parameters and 3D location information. This system is designed to allow incremental modification similar to sanding down a surface or adding mass to a surface.

This invention describes how one can change 3D geometry and parameters associated with 3D geometry with a set of simple physical tools and software. In its preferred form the software invention used for creating surfaces is the combination 3 elements for surface manipulation:

1. 3D manipulation (6 degree of freedom) device applied to CAD design
2. means of recording, and modifying parameters for controlling a surface such as filtering parameters
3. a software definition of surfaces that generates surface information from an array of stored geometry information together with parameters such as filter coefficients that describe how to spread out the effect of a surface manipulation CAD models look stiff due to the fact that parameters are fixed for each CAD command. A sculptor working on clay continually varies many parameters simultaneously such as the width of smoothing effect of her hand and the angle of the hand relative to the surface normal as it sweeps over a local region of a sculpture. Typically 3D input into CAD systems modify locations of datum points in 3 space while we focus on the effect of the manipulation on not only the immediate surface point but on the impact on the surrounding surface region. A sculptor could care less what the coordinates were of the corner of an eye but they would care deeply how the bridge of the nose blended into the eye corner and into the eyebrow.

Typically processing of surfaces operates along the surface normals while curves are processed using tangency information.

A key issue in the above concept of the design studio of tomorrow, is the availability of accurate input devices together with suitable sculpting software, which in turn can preferably interface. This in turn requires the software used to be usable with existing CAD systems and in turn the ability to create whatever surface is made into real material, be it clay, or dies or whatever.

We have invented a new form of software in this regard utilizing a mesh (triangular or rectangular) or surface which can be stored as a set of geometry (typically x, y, z, and surface normals) and associated parameters, including smoothing parameters. The software can generate curves, surfaces, solids, or meshes, taking geometry data inputs from electro-optical or other position sensors. When used with an existing 3D model of an object, this position data is used to locate the nearest mesh point in the spreadsheet geometry data in order to associate the spreadsheet parameters which are to be changed.

Typically parameter changes are made while position data is being taken, with a second apparatus operated by the designer which has a control such as a dial or slider which is manipulated to record or modify specific parameters on a continuous basis as the designer sweeps his hand, finger or an object through the space he wishes to describe. This set of parameters can be stored, along with the geometric data, like a spreadsheet to allow complete flexibility to generate new 3D shapes. By tying the 3D input and the control parameters to this "geometric spreadsheet" a user can input geometry and parameters that have the flow of the sculptor's motion rather than having a set of fixed numeric parametric values and a set of geometric point data that does not have the diffuse effect of a sculptor's stroke. A surface can be generate from the spreadsheet data at any time allowing the user to iteratively work toward his masterpiece. The surface can be reshaped feeding sensed data as to hand, finger or object position to the program which can then raise or lower with respect to some coordinate reference around one or more of the mesh point intersections. With a suitably fine mesh, quite detailed sculptured surfaces can be created or modified simply by moving ones hands or fingers for example. This has never been done to our knowledge.

The simplest processing algorithm involves storing a surface as a spreadsheet of geometric data. A typical surface is described by a set of flow lines: a set of U flow lines and a set of V flow lines that are roughly perpendicular to each other. At each intersection we have a node which can be treated as a 3D point with associated tangency and curvature information.

A "Geometric Spreadsheet"

Figure 1B:
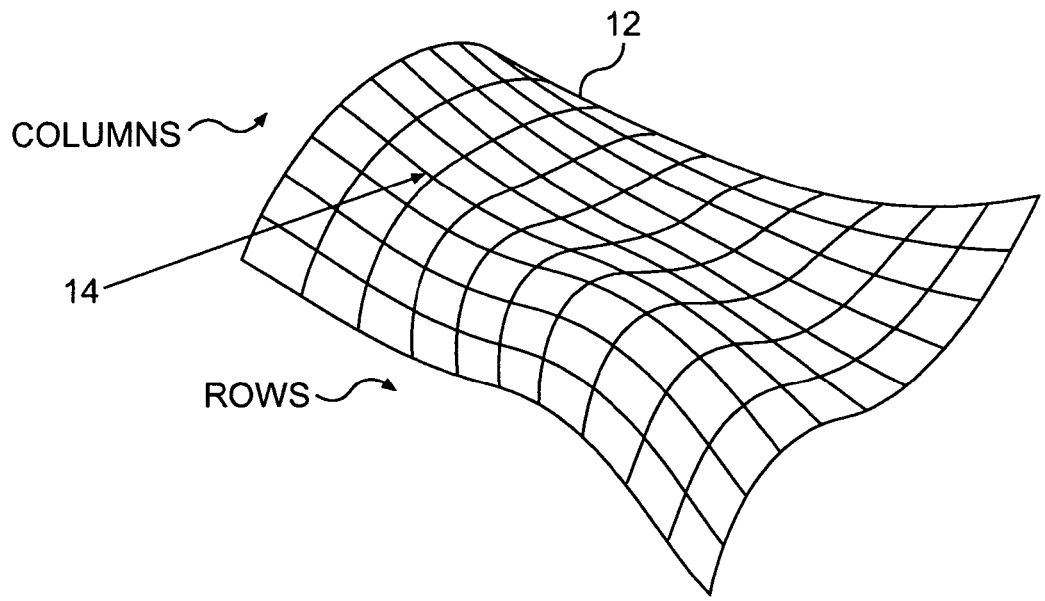

One can imagine a set of geometric data stored in a set of rows and columns where each spreadsheet cell has a set of information that can be used to define local information used to generate a 3D shape. Such a spread sheet is shown in FIG. 1a, and a resulting surface that might be generated there from is shown in FIG. 1b The information stored in each spreadsheet cell, for example, can be the same as the data in this "C" computer code:

```
typedef struct surface
{
float x;              float y;              float z;
float x_normal;       float y_normal;       float z_normal;
float x_suragate_norm;
float y_suragate_norm; float z_suragate_norm;
float x_row_curvature;
float y_row_curvature float z_row_curvature;
float x_col_curvature;
float y_col_curvature; float z_col_curvature;
float parameter1;     float parameter2;     float parameter3;
float parameter4;     float parameter5;     float parameter6;
float parameter7;     float parameter8;     float parameter9;
}SURFACECELL;
```

This can be used to generate a complete surface, a set of surfaces, or piece of a surface can be stored in this form. This data can be generated from a solid model, a surface model or a scanned in model. A typical surface can be described by a set of rows and columns of nodes that are interpolated by a mathematical surface (often a NURB surface today). The geometric and parameter information at each point can be stored as described above and reference by the row and column number.

We can mimic the typical CAD action of cutting or protruding along a given geometric direction. But we can also work as a sculptor who typically modifies a shape by adding or subtracting mass along the local surface normals. We have the ability to use surrogate surface normals from other models or from a local average of the nearby normals or the normals of a specific feature. We can use parameter to define smoothing kernels, depth of surface removal or addition, weighted average of modified information with current information, etc.

Thus the output (or modified) spreadsheet "O[I,J]" could be defined at each cell I,J by the weighted average (with weight W) of:
1. the input spreadsheet cell modified by the kernel H and displaced by a depth D along the normal
2. either the input (or original) cell itself "I1[I,J]" or the cell from a second spreadsheet "I2[I,J]".

Mathematically we could express this as:

$$O[I,J] \rightarrow W*(H\{I1[I,J]\}+D*i1[I,J])+(1-W)*I2[I,J]$$

H{I1[I,J]} is used here to depict the action of a kernel function that could be used to smooth, or add/subtract from the surface. Imagine a smoothing kernel formed by a 3 by 3 weighted average. In its simplest form parameters would be used to define 9 parameters such that:

```
1 = A[0,0] + A[-1,-1] + A[+1,+1] + A[-1,+1] + A[+1,-1] +
    A[-1,0] + A[+1,0] + A[0,-1] + A[0,+1]
H{ I1[I,J] } = A[0,0] * I1[I,J] + A[+1,+1] * I1[I+1,J+1] +
    A[-1,-1] * I1[I-1,J-1] + A[-1,+1] * I1[I-1,J+1] +
    A[+1,-1] * I1[I+1,J-1] + A[+1,0] * I1[I+1,J] +
    A[-1,0] * I1[I-1,J] + A[0,+1] * I1[I,J+1] +
    A[0,-1] * I1[I,J-1]
```

One way to use this kernel smoothing process is to have this operation apply to the scalar change in location along the surface normal. So the values of I1 at any location in the 9 locations surrounding I,J are defined by the plane through the I,J point and perpendicular to the surface normal used at I,J.

In a more sophisticated form the kernel can be defined by distances (usually normalized) where information is interpolated along the flow lines that pass through the points stored in the geometric spreadsheet. This compensates for the fact that the nodes are not equally spaced and thus the kernel weights, A, should vary if we were rigorous.

FIG. 2

In practicing the invention, the positions or movements expressed are preferably sensed optically (typically in 3-Dimensions by Stereo TV camera means), and the results used to modify or create programs describing the solid model to be created. The invention however can be used with conventional mouse or other type 2-D inputs to allow the user to track a cursor along flow lines displayed on a two-d display, using a novel control panel to input parameters to the software system. This panel can also be used in other embodiments as well.

One such parameter control panel consists of sliders, dials, and/or switches used to change 3D geometry and parameters associated with 3D geometry with a set of simple physical tools and software. This control panel can be connected to the computer through any standard interface that reads the location of the slider, dial or switch and converts each location into parameters for software control. Some of the ways that the location can be acquired by the computer are:

1. the sliders and dials are attached to potentiometers attached to analog to digital converter in the computer
2. the sliders and dials are attached to potentiometers attached to the computer as if they were game controllers
3. the sliders and dials viewed by cameras and have location determined by image processing algorithm
4. the sliders and dials are attached to a light source or attached to material that blocks light from a source. The intensity of the light from each slider or dial is captured by a separate optical fiber. The fibers are separated and the cluster is then captured by a video camera connected to a computer. The light intensity of any fiber can be mathematically mapped to a linear relation between the location of the slider or dial and its associated computer variable.

Now in addition to the control panel one can Use a 3D input device with the control panel described above. The 3D input device is used to define the path around which the geometry processing using the control panel parameters is acting. Such a device is shown in FIG. 3.

As noted above, one can alternatively use a 2D device such as a mouse together with a predefined path in space to serve the same purpose as the 3D input device. An advantage of this approach is that the motion along the path will be constrained to a smooth path. Examples of such a path are as follows:
a. a surface flow line
b. a row or column of points in an array
c. nodes along a polyline or spline
d. a action path curve software methods for smoothing, sculpting surfaces and modifying curves with blending different data sets and smoothing. The methods can apply to structured or unstructured meshes or surfaces. such a software system can enhance current CAD systems by 5. digitizing along a curve we can use alternatively one camera and then another camera. Since we are digitizing a path curve, we can interpolate the missing second camera information.

We use models iteratively. We can create or modify a curve or surface in the real world scan it optically in 3D and then blend using a weighted average of new and old information where the weighting parameters and the extent of the model that is effected by the new information can change locally on the computer model where we desire.

FIG. 3

To recap, one purpose of the invention is to facilitate creative expression of a designer of objects, and generally sculpted objects, by allowing him or her to use, in a natural fashion, hands, fingers or objects to express to a computer what shapes or changes in shapes to objects are desired. These movements are to the designer, gestures of what the shape of the object might be. While optically based sensing of gestures has been done to recognize peoples intentions, this is the first known application of optically sensed gesture inputs and related software methods using same for the purposes of establishing shapes of objects.

FIG. 3 illustrates this situation, in an alternative embodiment for human input in a computer workstation, somewhat similar to that of FIGS. 1–3 and FIG. 19 of our co-pending application Ser. No. 09/138,285. This particular embodiment also advantageously employs a physical model to create a reference for movement of the designer, as well as to facilitate his understanding. Either one or two handed interaction can be done. Two handed interaction is desirable, and can be achieved with the invention if the model is small enough to be held in ones hand or easily supported on a platform moveable interactively by hand.

The Model used can be of basically three types.
1. A model close (and perhaps in the beginning of the session, identical) to the beginning and reference model stored in the computer.
2. A model similar to, but not identical
3. A surrogate model which could be a generic four door vehicle model (if one was designing a new four door, say), perhaps quite different in detail.

Model 1 clearly feels closest to what is on the screen in the human sense. And at some point it may be desirable to create a new model when the displayed vehicle deviates too far from the real. This can be done with Stereo lithography for example, using the SLA system made by 3D Systems company.

Figure 2:
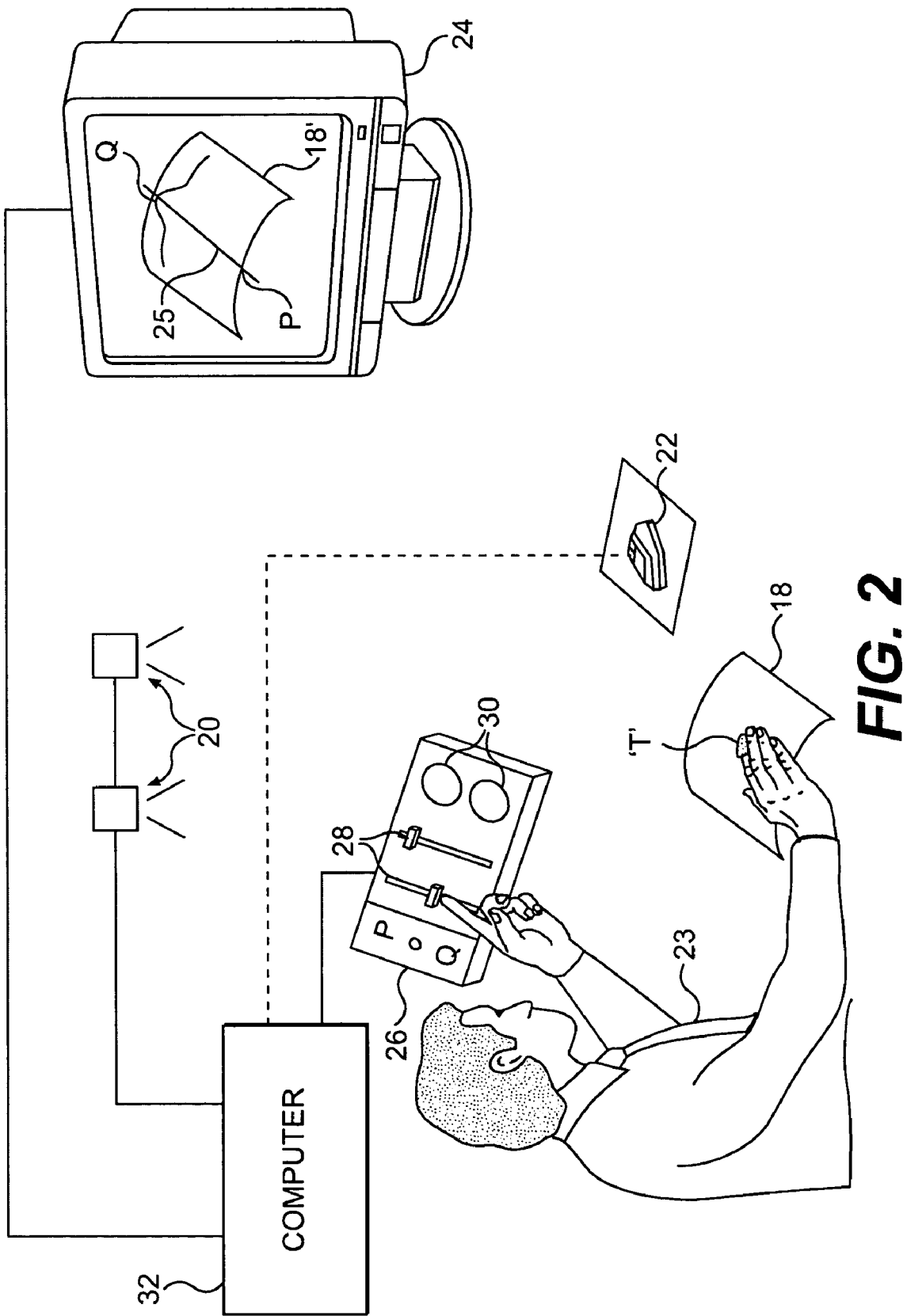
FIG. 2 illustrates a device for entry of variables facilitating interactive design with conventional inputs such as a mouse

Use of ones finger or an instrument to effect change (even if only in the virtual computer data base) on a real appearing and feeling 3D model provides a more natural input in 3D space compared to the mouse of FIG. 2, and can be used with the knobs and slider input device or not, depending on configuration. Like the mouse input, one need not touch exactly the points needed on the model, but rather just get close to pre-stored or calculated "flow lines" in the computer, in order to instruct the computer program that you mean to exert some effect on a node and the area around it along a particular flow line running front to back on the car for example.

Figure 3A:
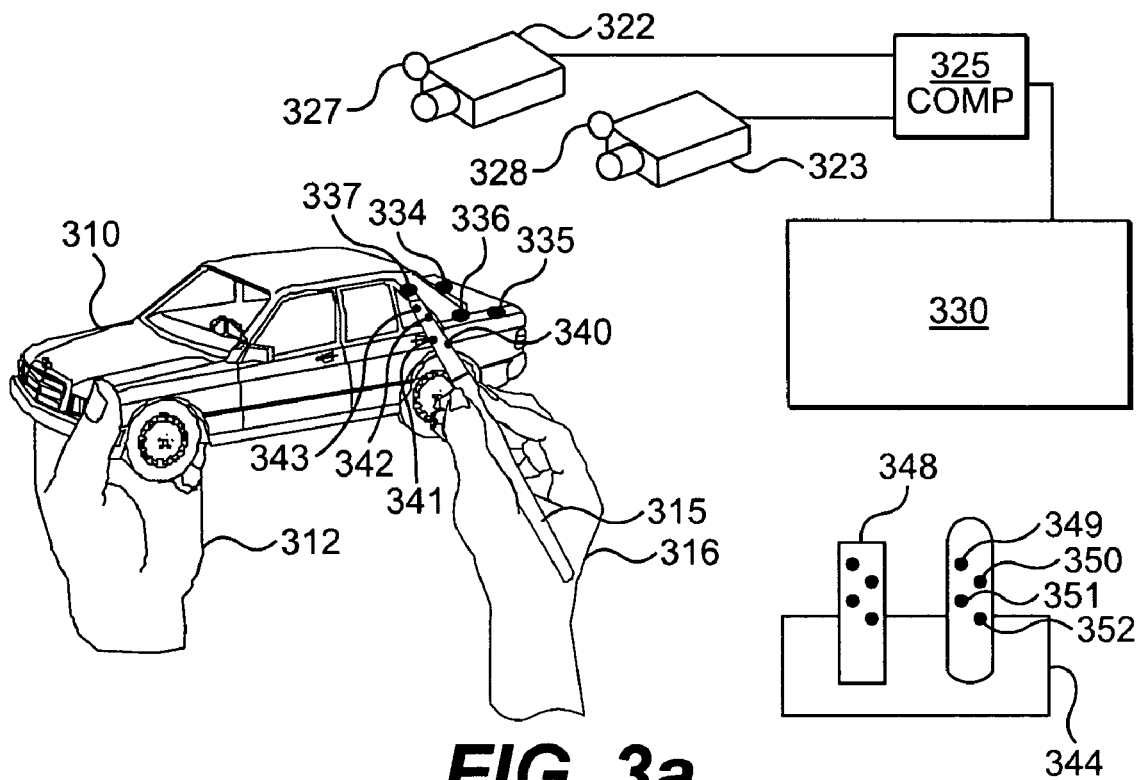
FIG. 3 illustrates an alternative data gathering and entry embodiment of the invention for human input in a computer workstation, somewhat similar to that of FIGS. 1–3 and 19 our co-pending application Ser. No. 09/138,285, and employing a physical model and either one or two handed interaction.

FIG. 3a illustrates a method for entering data into a CAD system used to sculpt a car body surface, in which a physical toy car surrogate for a real car model, 310, representing for example the car to be designed or sculpted, is held in a designers left hand 312, and sculpting tool 315 in his right hand 16. Both car and tool are sensed in up to 6 degrees of freedom each by the stereo camera system of the invention, represented by cameras 322 and 323, connected to computer 325 used to process the camera data, enter data into the design program, and drive the display 330. Special target datum's on the objects to be sensed are employed in this example, such as 334–337 on car 310, and 340–343 on sculpting tool 315. These target datum's are desirably of high optical contrast, and may be colored targets, LEDs or retro-reflectors for example. In FIG. 1, glass bead retro reflector targets made of Scotchlight 7615 material by 3M company are illustrated, illuminated by coaxial or near coaxial light sources 327 and 328 mounted to cameras 322 and 323 respectively. Such light sources are typically LEDs and preferably Infra-red LEDs to avoid disturbance of the user.

A display of a car to be designed on display 330 is modified by the action of the computer program responding to positions detected by the camera system of the sculpting tool 315 with respect to the model car, as the tool is rubbed over the surface of the model car surrogate.

One can work the virtual model in the computer with tools of different shapes. Illustrated are two tools 340 and 341, in holder 344 of a likely plurality, either of which can be picked up by the designer to use. Each has a distinctive shape by which to work the object, and the shape is known to the design system. The location of the shaped portion is also known with respect to the target datum's on the tools such as 350–352. As the tool is moved in space, the shape that it would remove (or alternatively add, if a build up mode is desired and selected in the meshing software described below) is removed from the car design in the computer. The depth of cut can be adjusted by signaling the computer the amount desired on each pass. The tool can be used in a mode to take nothing off the toy, or if the toy was of clay or coated in some way, it could actually remove material to give an even more lifelike feel.

Each tool may optionally have an automatically readable code, such as a bar code or dot code that also indicates what tool it is, and allows the computer to call up from memory, the material modification effected by the tool. This code can be in addition to the target datum's, or for example, one or more of the datum's can include the code.

Figure 3B:
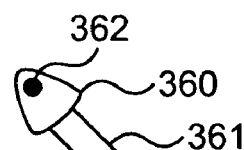

FIG. 3b illustrates an alternative method for interacting with the model, comprising a special thimble 360 on the designers forefinger 361. in one example thimble has a small datum near its end, for example a glass corner cube retro-reflector which can be seen by cameras 322 and 323.

The user can touch any area of the model desired in order to command the computer system whether to add or subtract material at that point in the displayed virtual model, or bring in another shape from memory, for example. Or the designer might decide to scan the model with his finger by sweeping it across the surface, in order to obtain a digitization of the surface contour along the direction swept. This is useful in the case where one starts with an unknown model for which no data base exists in the computer. It should be noted that for the purposes of digitization or otherwise, the cameras 322 and 323 can also be used to determine the location of a projected point or projected points on a laser line such as 362 projected by a laser line "pointer" (not shown) on the model surface. Alternative to a line, a grid or grille of lines or other structured light may be projected as well, to allow complete 3D shape patches to be obtained at once.

Figure 3C:
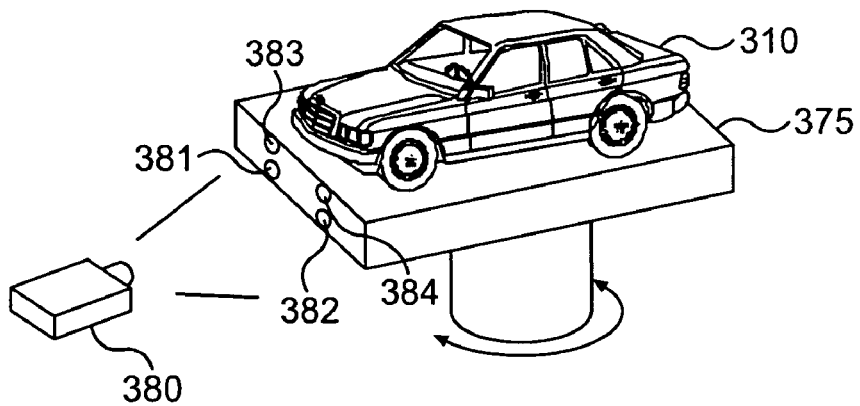

In another manifestation, the designer might wish to use his finger directly, without the thimble, and for this purpose could advantageously employ a glass bead retro reflector of Scotchlite 7615 on his nail in the FIG. 1 system FIG. 3c illustrates an alternative situation in which the object model 10 (in this case a car) is positioned on a movable (in this case on a gimbaled mount) pedestal 375 to provide added stabilization for the model, especially useful when larger models are used. (e.g. 1:18 scale or larger).

In this case the datum's may reside on the gimbaled mount rather than the model, if the relationships between the two are known or taught to the system (how?>)

FIG. 3c also illustrates the use of an optional separate camera system to seen the datum's on the pedestal. In this case a single camera 380 as disclosed in our co-pending application, can be used to observe target datum's 381–384 on the bottom of pedestal The purpose of the interaction made possible by the above, is often to sculpt, for example using the methods described below incorporated in Software in computer 325 or a separate computer. By moving the tool, or ones finger with respect to the physical model, one can add or subtract or change the contour of the displayed virtual object.

Software and Procedures for the design of vehicles and other objects employing these concepts are disclosed below.

FIG. 4

Figure 4A:
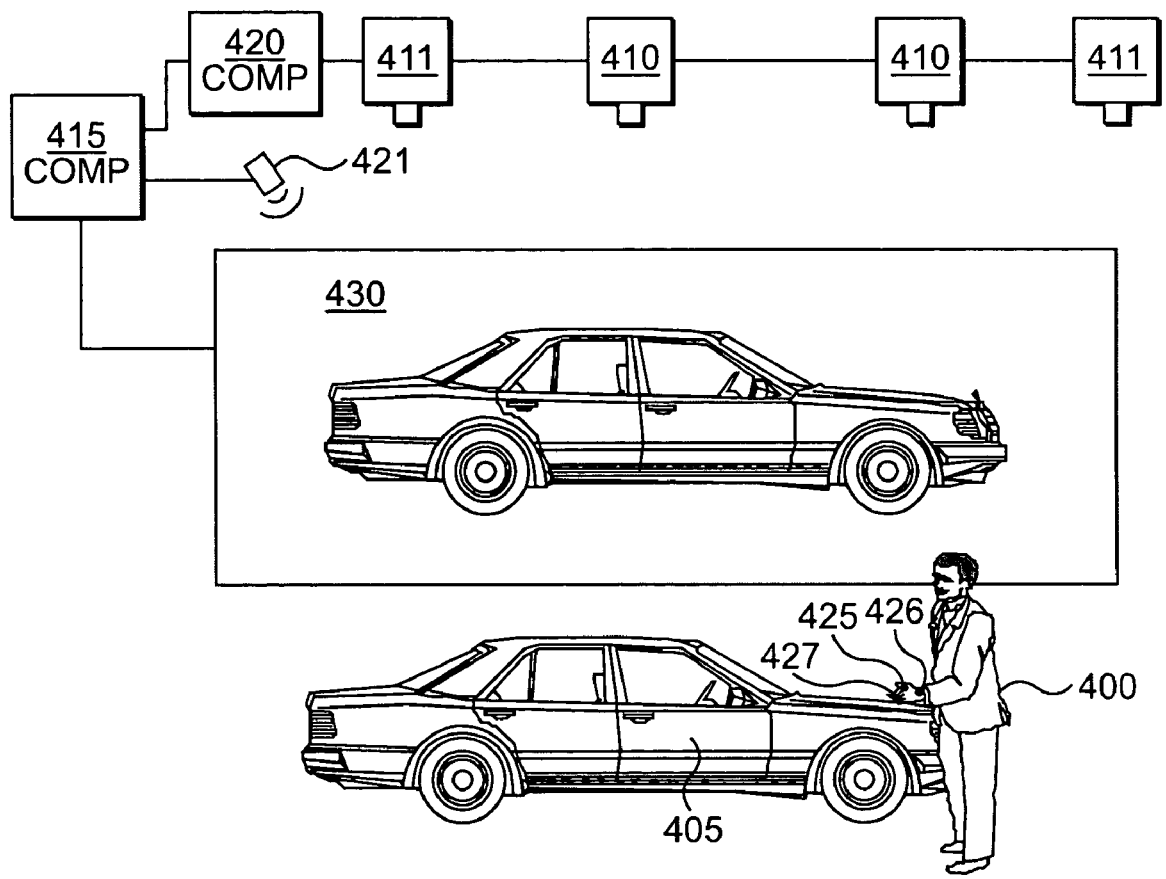
FIG. 4 illustrates an embodiment of the invention similar to FIG. 3, however for interactive use for with a large screen display, somewhat similar to that of FIG. 12 in our co-pending application incorporated by reference. This is illustrated in the context of a new form of design studio for car design.
Figure 4B:
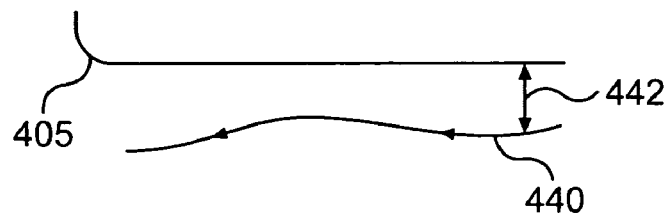
Figure 12:
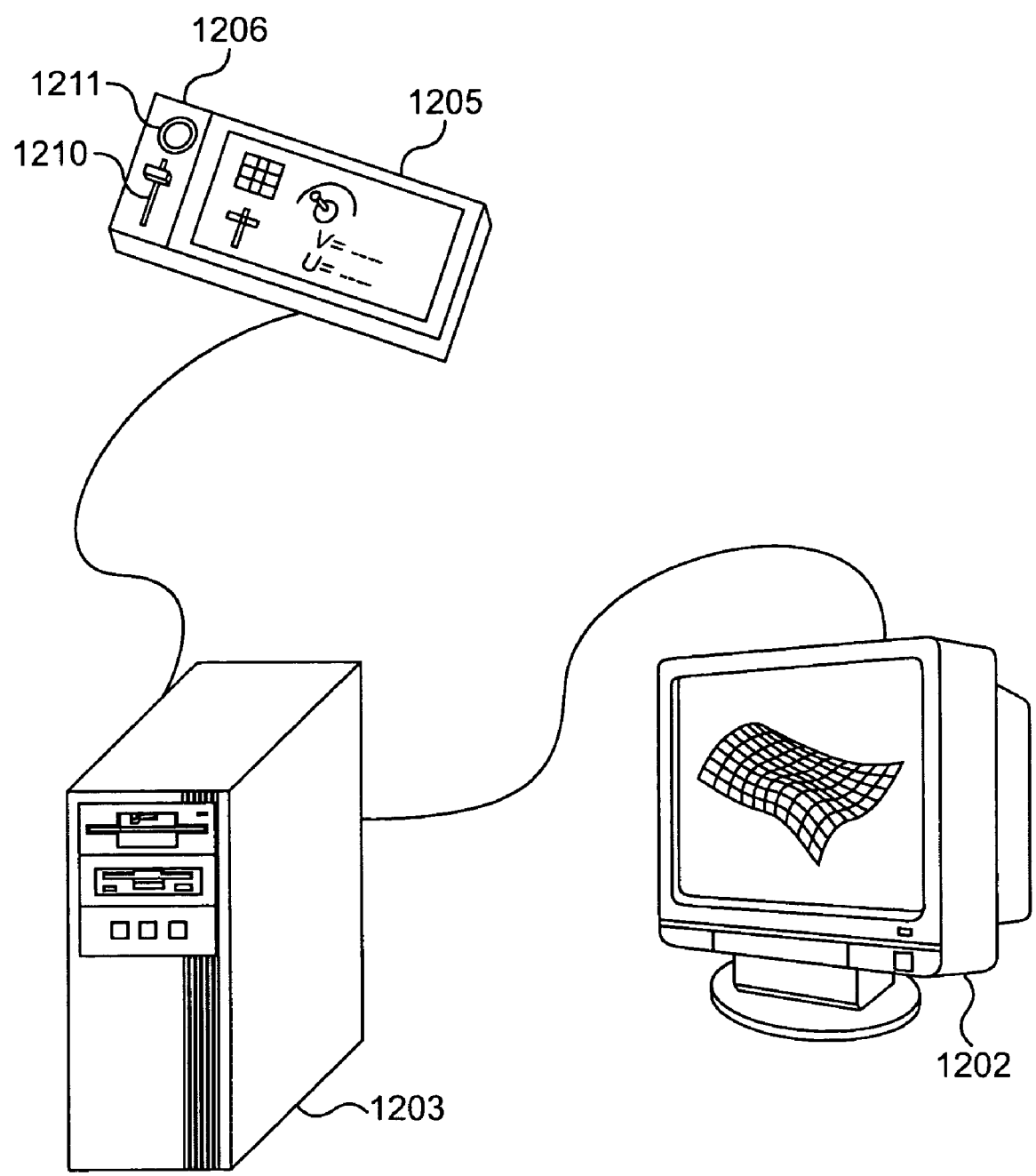
FIG. 12 is a human interface of the invention comprising a Tablet PC having associated physical controls such as knobs and sliders, which can be used alternatively to that employed in FIG. 2.

FIG. 4 illustrates a data gathering embodiment of the invention for human interaction with, somewhat similar to that of FIG. 3 but in this case with the designer interacting with a full size physical model and a large screen interactive display in a manner somewhat similar to that of FIG. 12 in our co-pending application. This is illustrated in the context of a new form of design studio for car design.

Consider designer 400 working for example with a full size car 405 (an actual vehicle or clay or other model of a proposed vehicle). Two or more cameras 410 and 411 view the designers hand(s) in 3D space, or objects held in the designers hand or hands. In this particular case specialized retro reflective targets are employed on his hands as disclosed elsewhere herein.

A large display, preferably full size, parallels the model and displays the computer generated image of the model or another vehicle, using software in computer 415. This computer is connected to computer 420 processing the images of the cameras 410 and 411, such that position or changes in position of the designers hands, for example, can influence the new shape of the software model. Voice recognition using for example programs from Fonix company or others, processes any voice based inputs of the designer received by microphone 421.

In this example, the designer, or other design participants as the case may be such as executives, are able to gesture with their hands and cause a change in the computer based model of the vehicle. And with suitable processing power, this can be done in "real time" allowing the designer a look in a full size view of the changes in outer body surfaces he was suggesting with his hands and voice for example.

In one illustrative example, let us take the case of a designer working with a current production vehicle for which a CAD model exists. He is standing next to the vehicle, and he wants to describe new shapes that could "freshen" its looks. In so doing, he might make a sweeping gesture with his hand down the side of the door in the fore-aft direction to describe a new desired "coke bottle" shaped contour of sorts. To aid the camera system, his hands may have high definition targets, such as the three retroreflective targets shown 225–227 on the back of his hand. Or he may wear a ring or other retro-reflector that can be tracked by the cameras. It should be noted that a tracking laser interferometer or other 3D type device can also be used (e.g. the Leica Smart) but should preferably be an absolute type, which doesn't have to be reset to zero again if the beam is broken.

The camera system picks up the succession of 3D coordinate points making up the gesture and feeds this new coordinate information to the computer, The computer may smooth these points (for example by fitting curves and/or eliminating outliers), and then modify the CAD model accordingly, displaying the results. The designer might with his voice indicate that the whole shape top to bottom is to be so changed. Once he sees the result, he might then make another gesture in the vertical direction to change a vertical section as well, and sweep his hands down the door for a limited distance to indicate the region over which this change is to be incorporated into the software shape data The whole process can be very fast. Other persons too, such as visiting executives or other designers, can, without training (a major issue), contribute their changes through their hand motions or other commands as well, and see the results immediately. This is much different than today, where days or weeks can pass before a new shape can be shown and intelligently acted upon.

It should be noted that a basic assumption in using the above is that the designers brain can meaningfully transpose from a real object in front of him, to a changed representation of the same real object on screen. At some point it may be desirable to reconstruct the real object to match the current (virtual) version of the changed object, from which the process can be continued. See also below.

It is also possible to instruct the software using two hands, where both hands positions or movements are picked up by the cameras. This is quite useful to capture natural spreading or shape gestures made by the designer.

It is further noted that an object, such as a "wand" might be held in the hand to indicate to the computer where a point on the surface should lie. Indeed a commercial photogrammetric wand of this type used for tool certification and the like made by Metronor of Oslo Norway, can be used with their tracking and analysis software.

Given the natural nature of dealing with car surfaces with ones hands it is more likely that a targeted hand would be used, for example the three led targets shown.

It is also possible to digitize a surface too by tracking the position of a hand or finger or another member, as it is swept over an object.

Historically, design studios in the car business are typically employed to create full size "clay Bodies" which can be viewed by those having a decision making capability relating to a new model.

In the "Studio of Tomorrow" made possible by the invention, it is envisioned that cameras in all locations necessary would be in place to capture the 3D position or motion of the designers hands or finger s. In addition, display screens all around can be used so that if he was trying to put a new shape gesture into the grille area of the vehicle say, that the grille area could be displayed in a manner that he could see in real time (computer power allowing) the results of his actions. Such screens may be on the walls of the room surrounding the vehicle, or as desired auxiliary screens can be located over head, or on swing down mounts. For example as the designer worked on the grille, a screen could be lowered down over the hood so he could see an image of the virtual grille directly in front of him. In this manner he could judge its juxtaposition relative to the other elements of the front end (in this case real) such as the hood and fenders and windshield.

FIG. 5

Figure 5:
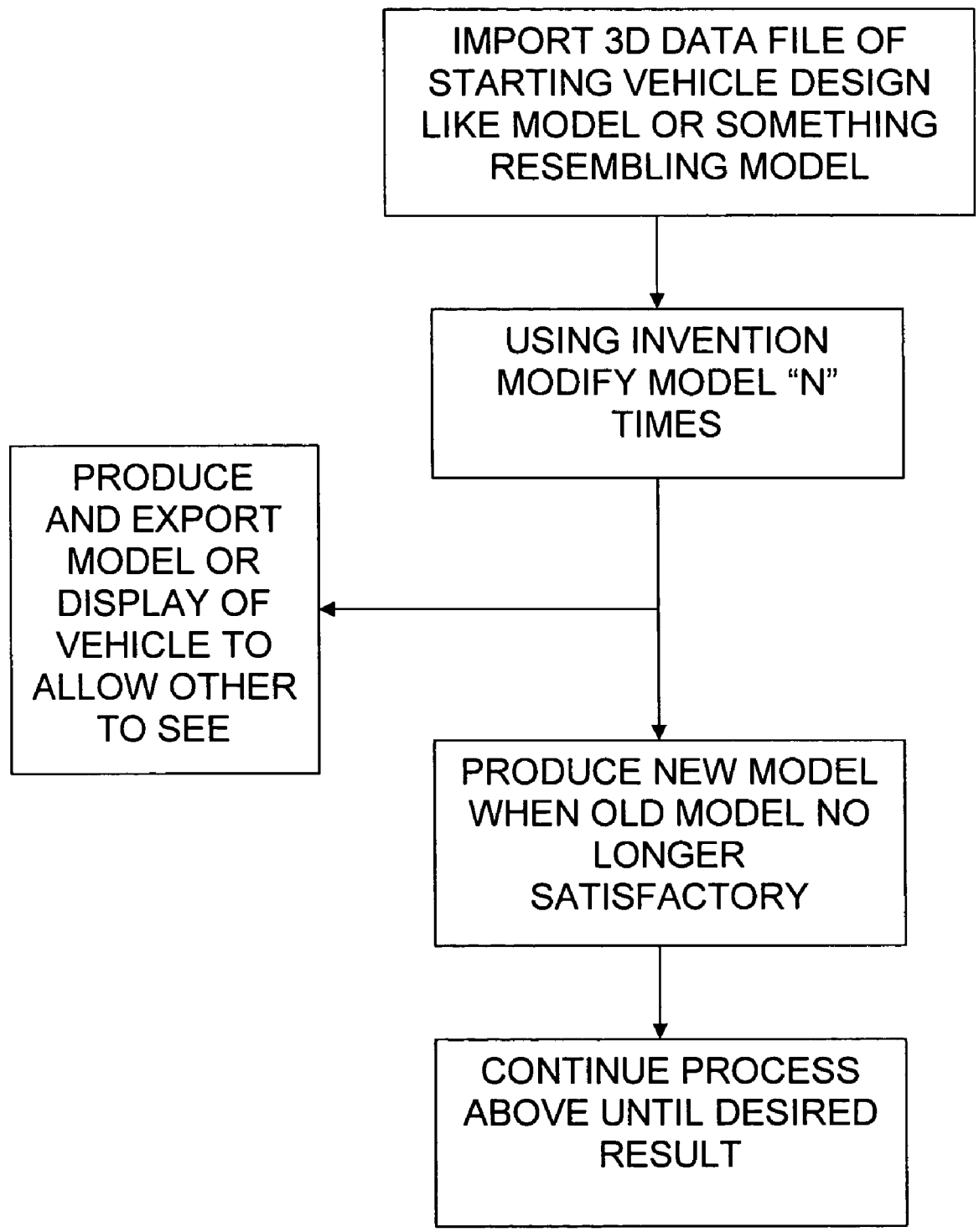
FIG. 5 is a block diagram of a physical process used in the car design employing either the studio of FIG. 4, or the workstation of FIG. 3 employing a physical model FIG. 6 further describes the sculpting features and method of the invention for use in creating a new car design "from scratch".

FIG. 5 is a block diagram of a physical process used in the car design employing either the studio of FIG. 4, or the workstation of FIG. 3 employing a physical model In the embodiment of FIG. 4, once the software mesh has been changed, the data can be fed to a conventional CAD system used by the manufacturer, and displayed in solid model format.

Once a particular model is found to be desirable, after say "n" iterations by the designer and others, the CAD system can provide data to a CAM program which could, for example using a CNC machine located next to the design studio, mill out the new version of the concept vehicle overnight or over a weekend. (depending on size and fineness of detail, and material). or a stereo lithography or other machine capable of producing 3D shapes can be used.

The first steps are the provision of a physical model and a starting CAD program for its surface shape. In the case as described above, where it is desired to freshen an existing design, this could be a real object such as a car, or a model car scaled from the real car. Alternatively, you could start with a vehicle of your competitor that was selling well and you wanted to emulate, for example. If it is yours, you have the CAD model in software (e.g. in CATIA by Dassault). If it isn't yours, you can digitize the vehicle of choice using known means (e.g. laser scanning machines and sensors such as those of Perceptron or Steinbichler), and provide the surface shape so digitized to the Software of the system herein.

The use of a physical model as a "prop" for guiding the variations therein imagined by the designer is a key feature of the invention. The need to produce a new physical model comes about as more and more changes are made to the software representation, such that the virtual displayed model becomes increasingly different than the physical one, thereby making the relationship of the designer to the model increasingly difficult. The need for such a new model depends on the user. Indeed a user with a very active imagination for 3D forms, may be able to even use a surrogate such as a block of wood for the physical model. If this block for example was the general minimal car shape, then his hands would thus describe all surface changes imagined. This approaches virtual reality demonstrations where people are seen waving their hands around with no physical reference at all. While intriguing, these are not generally useful for serious car design. The base, unchanged physical model is the go-between so to speak between the real and the virtual.

It is noted that the same meshing program can also be used if the shape is changed by physically adding or subtracting material from the real model. In this case a program offset is not required. (such an offset is generally needed when ones hands sweep out an imaginary surface displaced above the real one.).

We expect the invention above to considerably enhance and even alter the methods by which vehicles are developed in their early phases. The following figures now describe some of the new product design processes made possible.

FIG. 6

Figure 6:
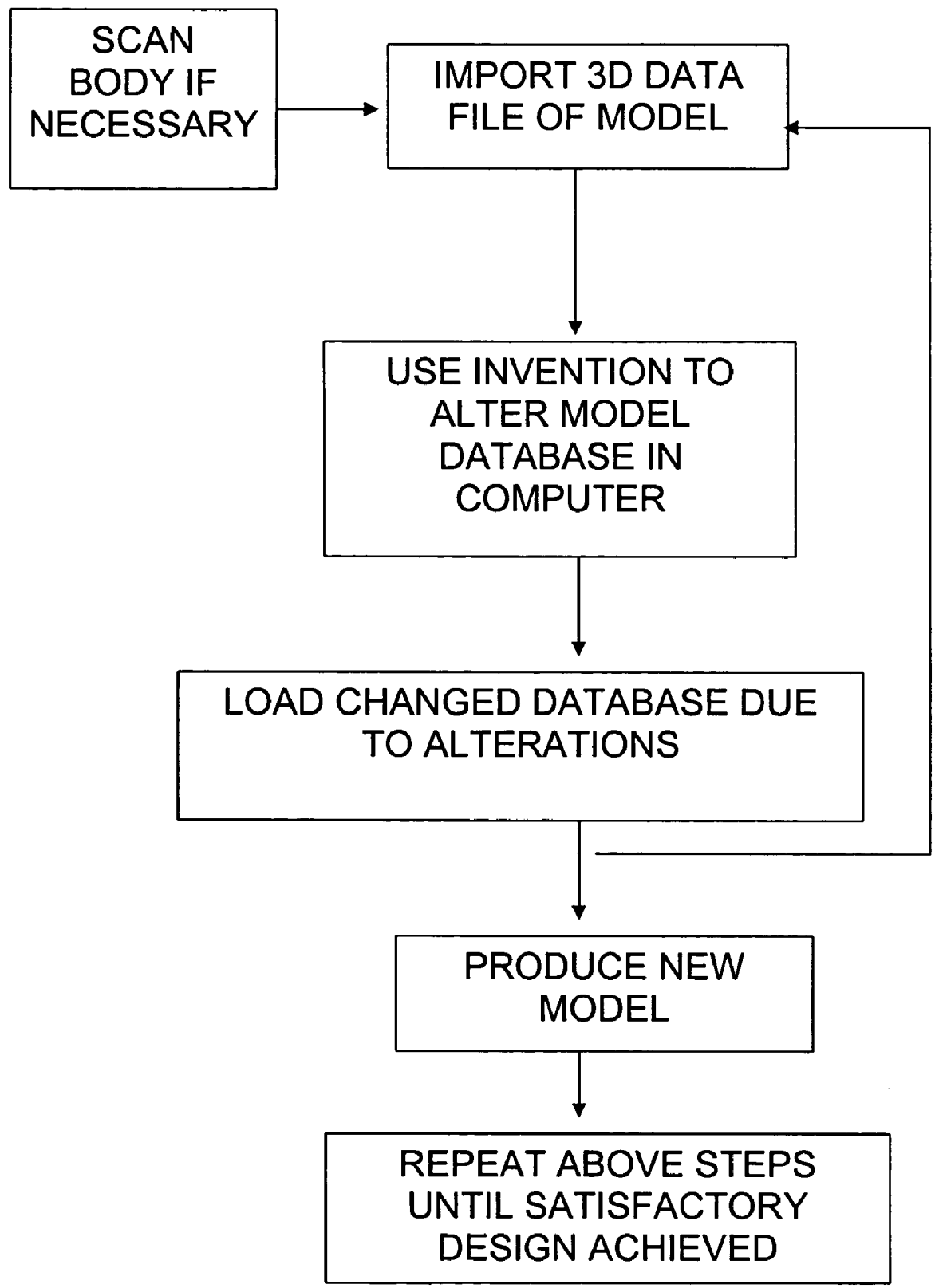

FIG. 6 illustrates a process used in the case of a new design, fresh from ones head. In this case the vehicle or other object such as a chair, does not exist at all. But there could be sketches or other inspirations to refer too, same as today. One way to do this is to start with a generic model of an object, such as a vehicle, or in the full size case, a real one. This could be for example vehicle of a competitor which as close as possible resembles something like what you want to end up with. In this case you scan in with laser scanners or otherwise the surface points of the competitive vehicle (for example using apparatus from GOM (Germany) or Steinbichler (Also Germany) or Perceptron (Michigan), and using these devices create the model of the vehicle, which is then altered using the invention and at the correct point a new model created, either small scale (e.g. using SLA), or if desired, full scale (e.g. out of clay, wood, or Styrofoam using NC machines).

FIG. 7

In addition to allowing one to design a freshly conceived object, the invention also concerns methods by which the development of new designs may take place and the software based algorithms which allow the rapid conversion of ideas into surface shapes which can be displayed or otherwise acted upon. One unusual version of this is to blend the design of classical car bodies with other more recent models. Or using the invention, one can blend competitor's creations with yours, and so forth.

Figure 7:
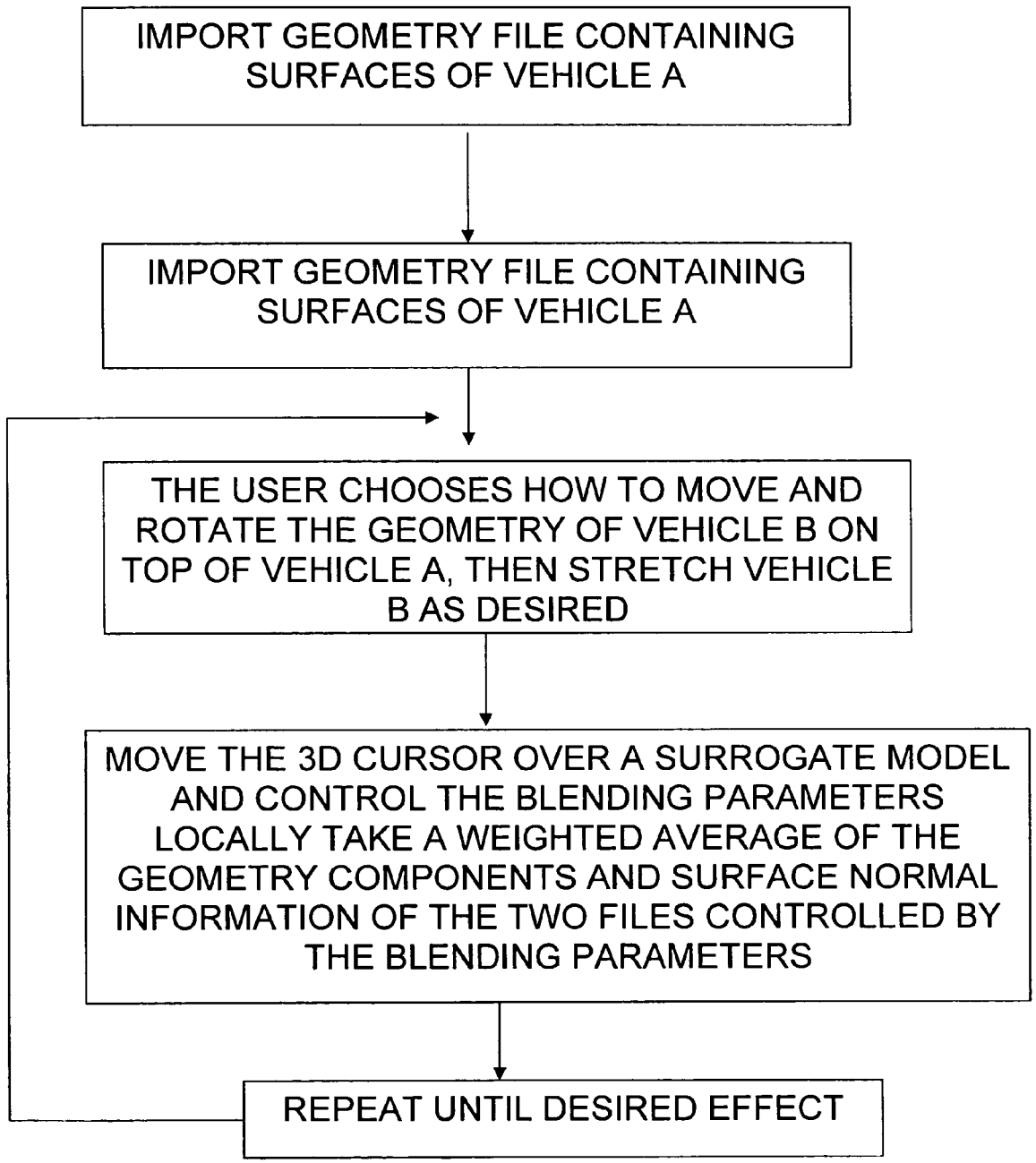
FIG. 7 is illustrates an alternative method for creating car or other designs using 3-dimensional components of existing designs.
Figure 9:
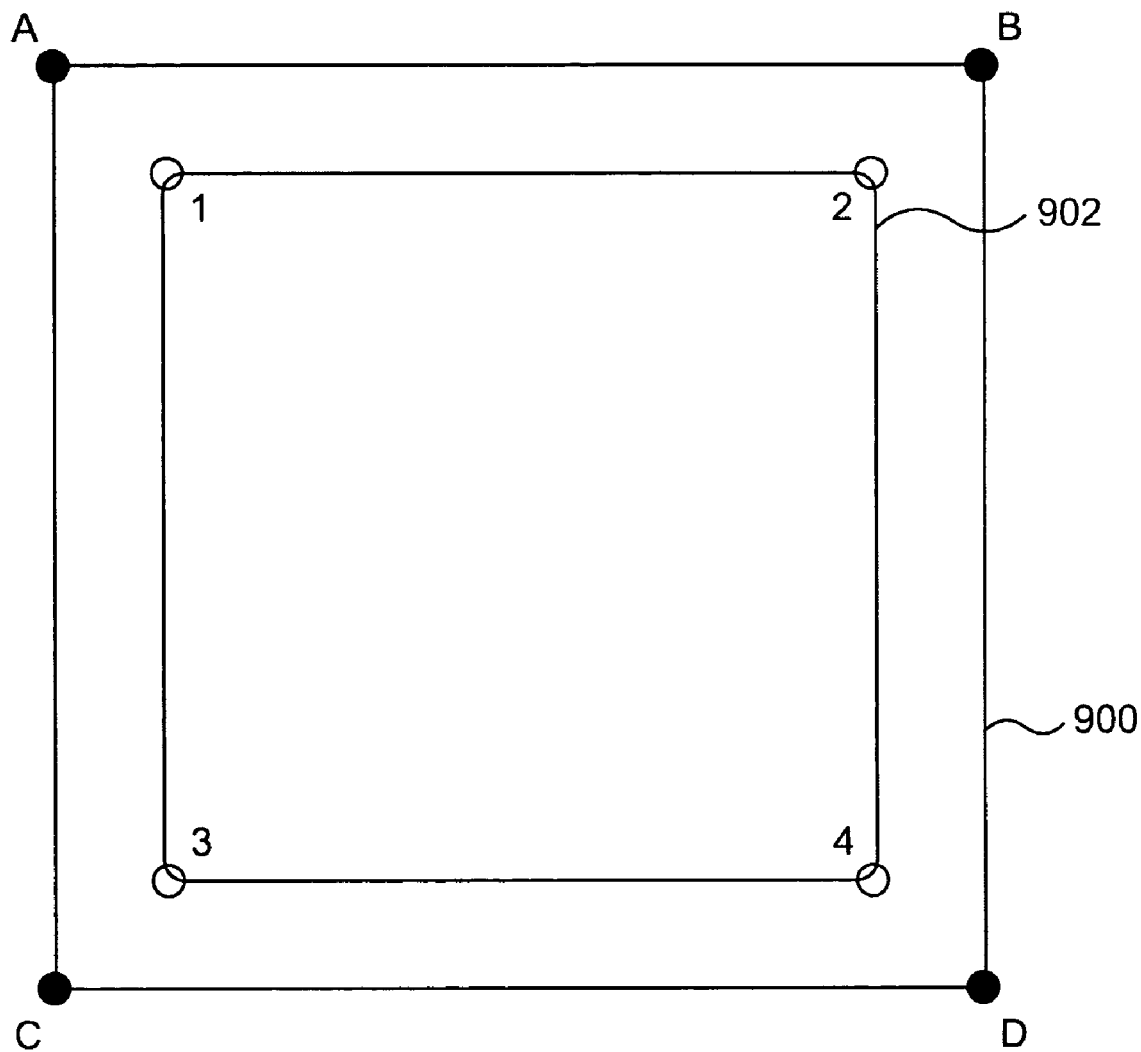
FIG. 9 illustrates registration of objects in carrying out the method of FIG. 7

FIG. 7 is a flow diagram relating to a "blending" feature of the invention useful in the car design process herein. The software of the invention has another unique property, namely that it can mix diverse surface shapes together—either in certain areas of a vehicle (e.g. a hood) or the whole object. This allows a heretofore unheard of capability to create computer based designs which are for example a cross breed in various user selectable degrees, of for example, A competitors vehicle and your own A popular car of the past (e.g. a 57 Chevy) and your present model, or a concept model A current line, and a concept model to bring continuity to the concept This capability can be utilized with no sensory input, or can utilize sensory inputs of the designer's hands for example, to cue the process, for example telling the program to change the weighting factors of the program in that region by waving ones hands more or less in the zone as one moves over the zone. The weighting function at each point on surface. Vectors U and V a function of 10% A and 90% b say. This could be for the whole rear end, or for just the area indicated by the designer. Think of the fun of playing with it and presenting different ideas!

This feature is believed to be of considerable value to the car industry, as many changes and other features are influenced by other designs, and this allows one to most rapidly see the effect. A common expression in the car trade such as "the back end looks a little like an Audi A8" for example, could in this case be achieved in software by combining the A-8s data file with yours—say to a 15% degree.

FIG. 8

Another example is to have a library of various functions relating to well regarded vehicle shapes, even in local areas. A library could for example include 100 of the most desired examples of regions around headlamps, door handles, taillights, and the like. These shapes too can be blended in to sections as desired, by whatever percentage is desired using the invention. We can also develop a library of smoothing or morphing kernels such as those illustrated in FIG. 8. These can be used as described in FIG. 1.

FIG. 9

When blending whole sections of vehicles there is a question of registration. One can normalize, in the program, the width of one vehicle to another, or the height or some other dimensions. For example, one can fix points on extremes such as hood edges, and normalize everything in between. Or you can fix common points such as Wheel centers, headlight centers, edges of The "A" pillar at the door line, or what ever.

FIG. 10

Figure 10:
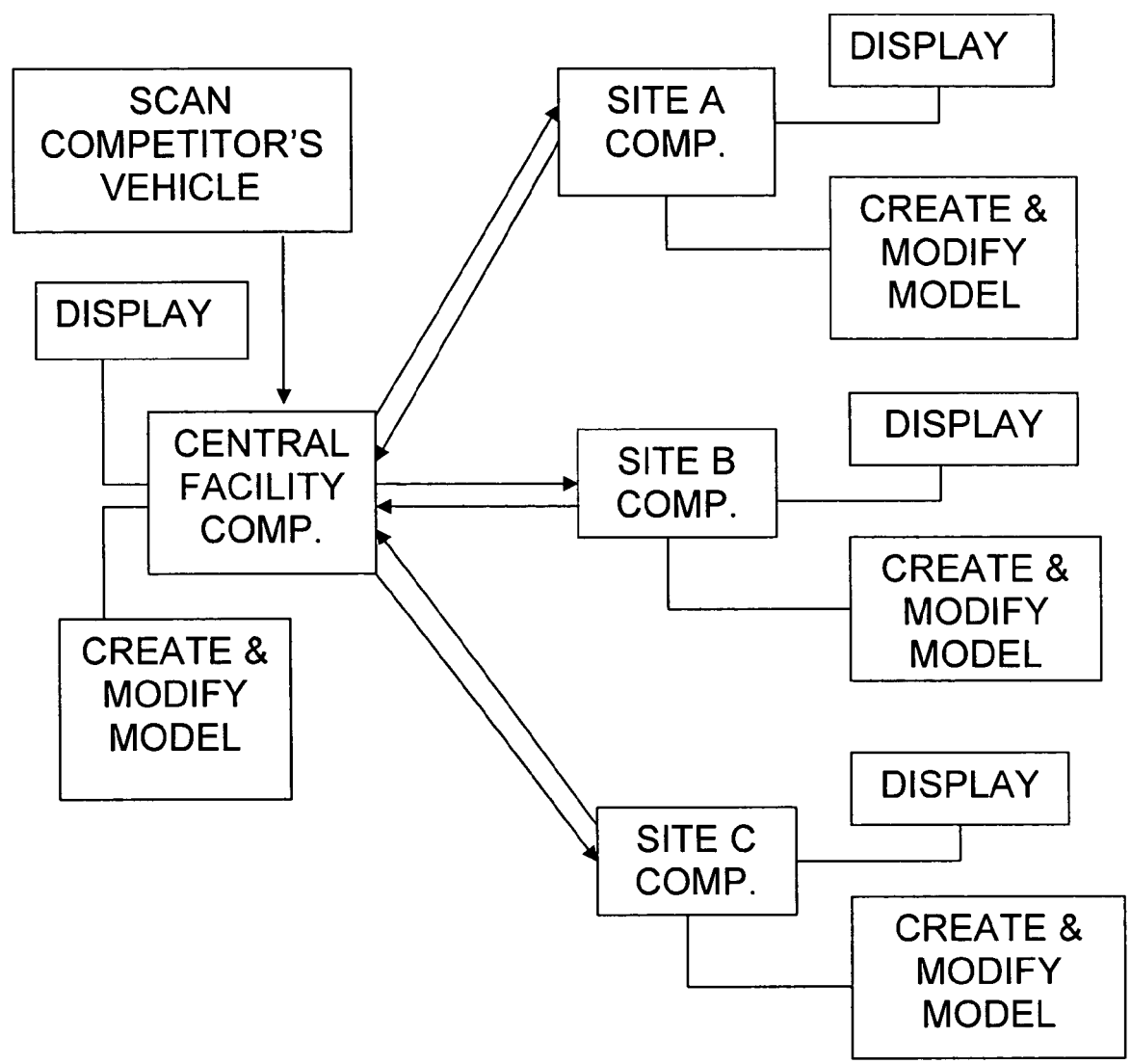
FIG. 10 is a block diagram of another aspect of the process used in the car design employing either the studio of FIG. 4, or the workstation of FIG. 3, further illustrating an ability of the invention to facilitate networked interaction of executives and designers as well as customers.

FIG. 10 is a block diagram of an another aspect of the process used in the car design employing either the studio of FIG. 4, or the workstation of FIG. 3. In this case we can assume several sites cooperating over a network They can be either workstations with small models, or full scale design studios, or both. This has two huge advantages:

It gives interested parties the chance to communicate via the internet or other networks even though their physical locations are widely dispersed.

Secondly, because the whole system is intuitive, even untrained persons can use it, and in this case be part of the interaction. This opens up the chance for Zone managers, Vice presidents, dealers and even potential customers to be brought into the process at virtually no cost.

The advantages are way more and varied input to the design, and much more rapid input to the evolution of a good selling design. This then allows these products to reach the market more quickly and garners extra funds from such a rapid market introduction.

FIG. 11

Figure 11:
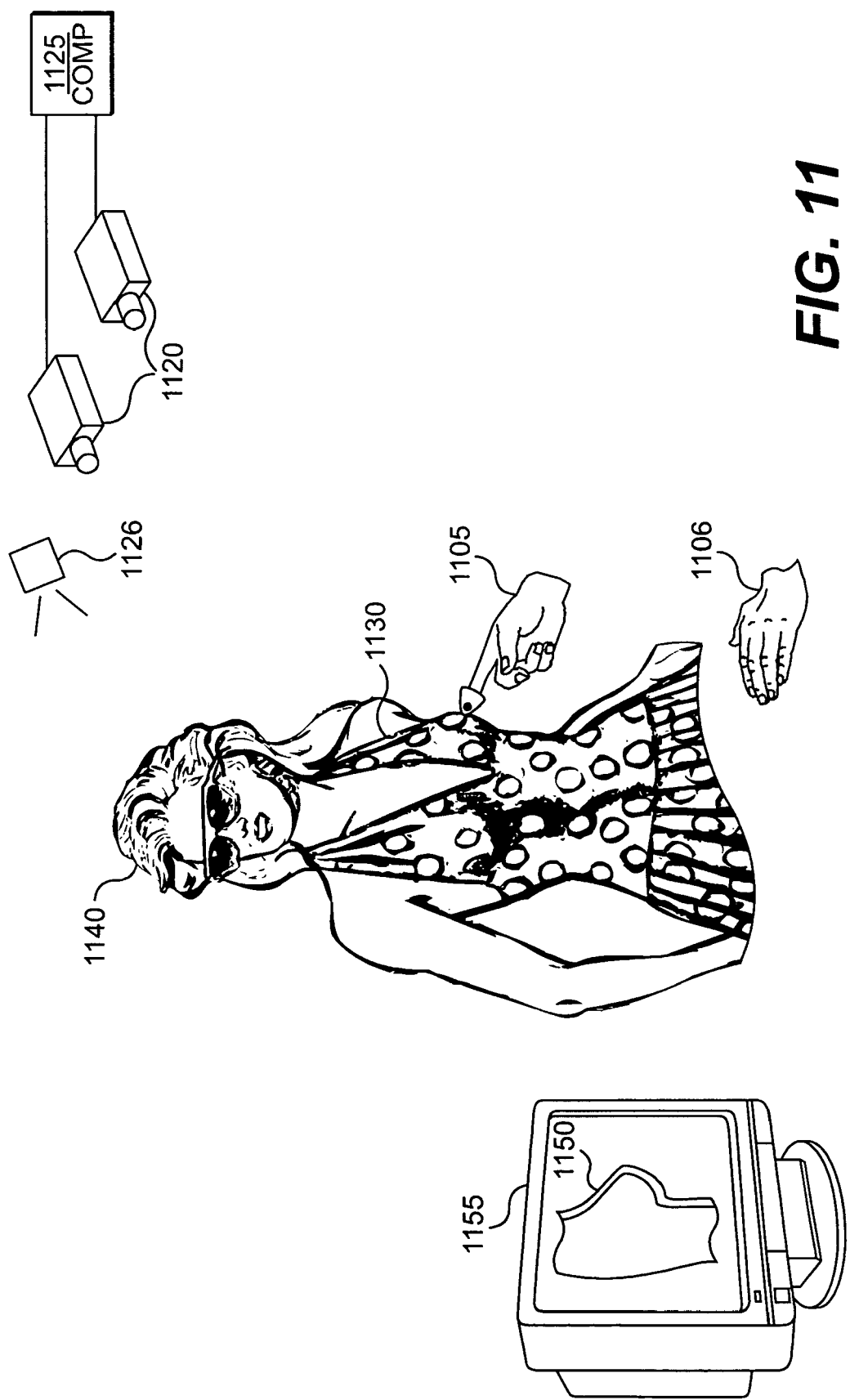
FIG. 11 illustrates the use of a 3D shape input object or hand or finger gesture in the form of a fashion garment

If the object is a shoe and is rigid, the argument is similar to the carbody. But a more general clothing case is textile apparel. FIG. 11 illustrates the use of a 3D shape input object or hand or finger gesture in the form of a fashion garment. In the first example the Garment is on a manikin or model. Can be an existing garment or a new designed one. And the person, real model or manikin, can be a surrogate for the intended shape of person. On the model, the garment has a shape, generally that of the model, but draping or otherwise departing there from in certain regions.

Figure 13:
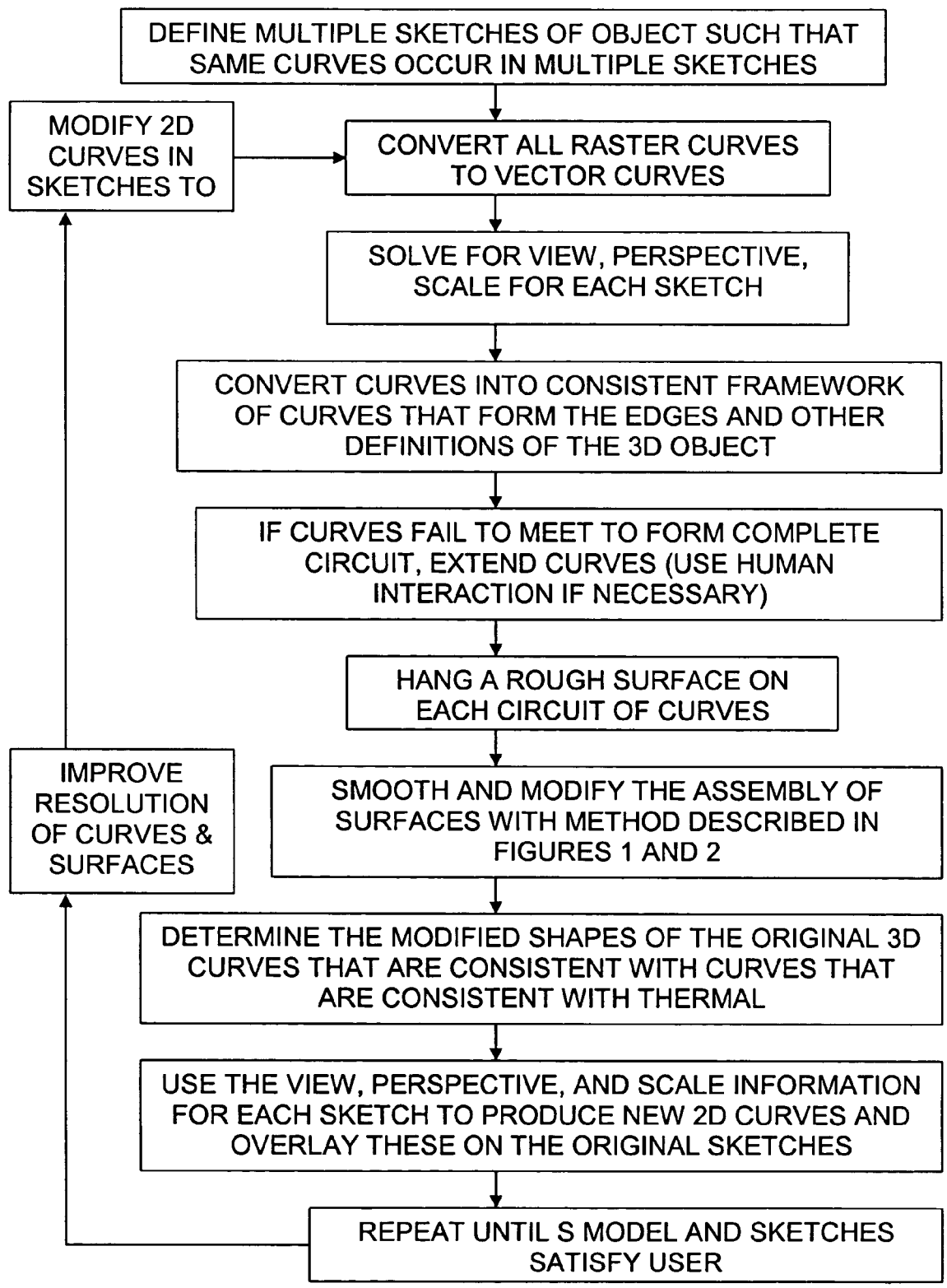
FIG. 13 illustrates a two dimensional sketching based embodiment of the invention using a Tablet PC drawing surface and interactive 3D capability

A real model is more interesting because the model can aid the designer in a manner for example shown in our cop ending disclosure Novel Man Machine interfaces and Applications, FIG. 13. In this case a fashion design application was noted where a pinching gesture or other finger or hand gesture was used to describe the place or amount to take in, on for example a dress. It could also using the software herein, be used to change the sculpted appearance of some item of clothing.

Similar to the car design application of above, a clothing designer 1100 with one or two hands 1105 and 1106, can move his or her hands over clothing such as blouse 1130 on a model or a manikin 1140, and cause the CAD representation in computer 11250 of such clothing in the after assembly state to be changed as well. This new state is displayed on display 1155 which is shown here in the form of a full length mirror (of a displayed height equivalent to the model) in order to provide a true to life view of what the new shape would be. This outer shape representation can then using known cutting pattern layouts be used to cut the cloth later to be sewn or otherwise assembled into the finished garment.

It should also be noted that the designer may make an object to be digitized of a particular concepted shape to be expressed.

FIG. 12

FIG. 12 is a human interface of the invention which can be used in place of the unit of FIG. 2 or for other purposes using a Tablet PC equipped with physical controls such knobs and sliders either on the screen itself or to the side thereof. This allows the user to adjust a value of a CAD parameter without physically looking at the screen, or at least reduces the amount of glance needed—important when one is trying to describe a surface form gesture using a combination of one hand moving thru space in 3D (photogrmametric sensing) or in 2D (e.g. mouse) but the 2D movement is guided by the program along a u or v curve known in the CAD art as in FIG. 1b visible on a three dimensional surface representation on display 1202 generated by computer 1203.

In one example of such physical control, a tablet PC 1205 such as a Fujitsu "Stylistic" model is located in further housing 1206. Also in housing 1206 are a pair of slider controls 1210 and 1211 which have digital outputs of their position by known means connected by known means (RS232, etc) to the PC 1205 which PC in turn is used to process data from any added human interface means such as photogrammetric means or computer mouse. In one exemplary embodiment the PC 1205 is connected via Ethernet or other networking means to computer 1203 containing CAD software of the invention used to generate the 3D display used by the designer,

FIG. 13

FIG. 13 illustrates, using a block diagram, a two dimensional sketching based embodiment of the invention using, in one example, a Tablet PC touch screen based drawing surface and having interactive 3D capability By way of summation, we define two or more 2D sketches from different views of an object. These can be hand drawn and scanned in with a conventional document scanner in order to digitize them. Alternatively Input can initially come from a sketch in a tablet PC, or from a digital camera or other 2D view generation. Multiple views must be constructed of a 3D object in order to over specify the 3D curves that will be produced from the 2D sketch curves. Generation of 3D curves from the 2D sketches can be made using known photogrammetric methods or as disclosed below.

One neat feature is to use photos taken at an auto show of a competitors concept vehicle for example. And one may first modify the sketches or photos to satisfy design qualities before doing additional steps. And If a sketch is a raster image, one can convert the raster to vector curves Each curve in a given image is a 2 dimensional curve. The sketch curves will not be consistent due to difference in scale, perspective, camera location and orientation, and in natural inconsistencies and errors due to sketching. Each sketch thus has its own "view parameters" that define the scale, perspective, camera location and orientation. One can use the redundancy in the curve definitions to produce a best fit of the "view parameters" and to extend the curve to 3D definitions. Optionally, shadows in the sketches or photographs may be used to better define curvatures One then can use the 3D curves determined from the above process to define a framework to hang the surfaces on.

At this point the surface generated is crude, with lots of bumps, troughs, and other problems. What is now disclosed is a method by which such surfaces created by common every day sketching or photography can be made useful in creation of usable 3D designs capable of computer manipulation. Because using the software and associated methods of the invention we can operate on the 3D surface generated using the teachings of FIGS. 1 and 2 and thus smooth and modify the surfaces as desired which have been generated by the sketching process.

To continue the design process we then may chose to take the character lines, edge curves, horizon lines, creases, etc and remap them with the appropriate scale, view, and perspective. And we then may overlay them on the original sketches.

After analyzing the results, and with the new curves as references, we may Define a higher resolution of the curves and surfaces for the next pass and repeat the process until design refinement is satisfactory Miscellaneous Points The invention can also be used to design an automobile or other interior. A designer can emulate a potential driver and sit in a drivers seat typical of what would be used in the vehicle interior to be designed. This designer then holds in his hand a datum (or the datum is provided on his hand or finger) which he can move to various locations in the vehicle interior that he wishes to create. AS disclosed elsewhere herein in the copending application referenced, datum positions and change in positions are determined and tracked by an electro-optical system, which can be a single or dual camera stereo system as disclosed in our copending application, or a laser tracker or other suitable device.

The designer may do this procedure in free space, but more likely would benefit by having some form of standard instrument panel and steering wheel that he might make reference to These could be conveniently mounted on a carriage or other device which can allows them to be moved out of the way as needed The person moves the datum around to achieve several goals. First by making various reaches he can move his hand or finger to different positions and in so doing, the electro-optical system can determine, and record, the desired distances to certain features such as the door handles, instrument panel controls, cup holders and the like, as well as maximum and minimum reach distances thereto. This determination is aided by voice recognition software in a computer used to process the sensor data and establish the data base of the dimensional data obtained.

Secondly, the designer can determine sight lines to fenders, objects viewed in the rear view mirror, and the like. These he can designate with his hand, by holding it up or pointing, for example. Or he can have an assistant do this, with datum locations on an assistant determined. Such positions can also take into account any physical mockups of fenders and the like which are provided with the designers other interior props such as seats instrument panel etc.

Third, the designer can describe, with a tracked and recorded motion of his hand—that is to say, a "gesture", a sweep that he might desire to see in the shape of something in the interior, for example the instrument panel or center console, or door trim. He can also designate the location of for example decorative features on any of these items as well.

As pointed out above, one can use the invention for the design of fashion garments, which like cars, are sold in part because of style, and which need to be replaced after a few years. But fashion garments are in general designed to fit a particular form, not comprise the form themselves. And the way in which they fit or drape, comprises a significant portion of the style. The rest, like cars, being color, sheen, texture, etc.

The invention is very useful for this field of endeavor as well. Fashion designers, like car designers, typically start with sketches, or by analyzing competitor garments which have been introduced at shows or are selling well. The invention as disclosed can convert two dimensional sketches into 3D models. In this case the 3D model sketched, is fitted in the computer, to models representing standard people (e.g. size 12 woman), or custom generated models derived from specific person's measurements. These models are most often virtual computer models created from the data base in question, but they may also be manifested as a physical model, such as a manikin (full size) or doll (scale model). These physical models can be worked with just as in the automobile case. And as described in FIG. 11, one can also use the invention to allow a real model to herself aid in the fitting of clothes once made.

In the two dimensional sketching based embodiment of the invention, illustrated in FIG. 13, a touch screen larger than a conventional Tablet PC is often desirable for sketching cars, buildings and other objects. One such device is disclosed in U.S. Pat. No. 6,008,800 by one of the inventors.

A CAD system can also be provided in which music affects the constants or variables of the equations used to describe surfaces and features of objects being designed. Music changes, can be used for example to change the second derivative of a curve lying on a surface.

The invention, in the spirit of the above, further includes method and apparatus for modifying the artistic flow of an object's shape as a function of musical notes and chords—either as a function of the character of the music itself (e.g. rock vs. classical), or as a function of the effect of the music on the designer.

Users can set up a complex arrangement of modeling parameters and associate them with a piece of music. This gives a mental queue for the user. The computer can play the music and sense/record the users motions at any point in the music. Thus if the user had associated a group of parameter presets that change with time as the music swelled and quieted, a user can wait to sweep his sculpting gestures until the appropriate swell in the music that gives the artist his desired 3D effect. Here are the steps to the process:

1. play a piece of music and record this on the computer along with the locations of the sliders, dials, and switches in the parameter control panel. The parameter panel settings will usually be changing with the music. Note that a business can be made in selling computer files that include the music and a group of parameter settings. On the other hand a user will enjoy a product that he can customize.
2. repeat this process for many music/parameter files.
3. for a given geometry model and location within that model an artist may choose a specific music/parameter file that has the right sharpness or slow sweeping nature.
4. the artist will choose a specific region of the model to work on and identify a specific path or set of paths associated with the model.
5. as the artist listens to the music he will move his mouse, 3D pointer, or 3D target such that the computer can identify where it is in the 3D model at any instance and associate a set of parameter settings that where active in the music/parameter file at that instance due to the user pressing a record button. the computer software program can then use the parameters to modify the geometry to conform to the settings and the path locations where the settings where applied.

There is also another aspect where the designer can use music to define the variable parameters, picking smooth and slowly varying surfaces to match a classical music Waltz feeling, while sharp abrupt surfaces would match Techno-Rock for example. (e.g. Cunningham C-7 or Aston Martin vs. a Pontiac Aztek).

What is claimed is:

1. A computer software based method for designing object surfaces comprising the steps of:
   providing a computer having a display;
   providing a means for electro-optically determining and recording in said computer the 3D location of a plurality of sequentially acquired points in space represented by a portion of a person or a member manipulated by said person using his hand or finger;
   providing a means for recording and modifying parameters associated with said points for controlling a surface in a model in said computer; and
   using said means for determining and recording point location and for modifying and recording associated surface control parameters, generating information concerning a surface in said computer model.

2. A method according to claim 1 wherein said parameter describes the manner in which a surface effect is spread out in the region of the surface represented by at least one of said points in space.

3. A method according to claim 1 wherein a plurality of 2 dimensional drawings are used to create an initial surface.

4. A method according to claim 3 including the further step of re-creating from a changed 3D surface one or more two dimensional views for analysis by the designer.

5. A method according to claim 1 incorporating the further step of displaying said surface of said computer model.

6. A method for designing an object comprising the steps of;
   Providing a computer having a display,
   Providing a physical surrogate of said object,
   Providing in said computer a data base of said object,
   Using said data base, displaying a 3D representation of said object,
   Determining the position of said surrogate,
   Determining the position of a freely movable member positioned by a person designing said object, and;
   From said position, determining changes to said object data base to be made in said computer.

7. A method according to claim 6 where said surrogate is a vehicle model.

8. A method according to claim 6 wherein said position determination is made using at least one TV camera.

9. A method according to claim 6 wherein said surrogate is held in a hand of said person.

10. A method according to claim 6 wherein said member is said person's finger.

11. A method according to claim 6 wherein said member is said person's hand.

12. A method according to claim 6 wherein said member is held in the hand of said person.

13. A method according to claim 6 including the further step of determining the orientation of said member or said surrogate.

14. A method according to claim 6 including the further step of making a new physical object from said changed data base.

15. A method for design of a vehicle or another 3-dimensional object using an existing object as a basis, comprising the steps of:
   Importing a data base of the existing object surface into a computer,
   Determining the location in space of at least one point on a hand or other portion of a designers body, or a member held by said designer, with respect to said object,
   Moving said point to signify changes desired in said object, and
   And from said determined locations, determining changes to said object data base in said computer.

16. A method according to claim 15 wherein said location is determined electro-optically.

17. A method according to claim 15 wherein said object is full size.

18. A method according to claim 15 wherein said object is a scale model.

19. A method according to claim 15 wherein said model is held in the other of said designers hands.

20. A method according to claim 15 wherein said data base is derived by scanning the existing object.

* * * * *